United States Patent
Paulsen et al.

(10) Patent No.: US 11,738,417 B2
(45) Date of Patent: Aug. 29, 2023

(54) SUSPENSION STRUT FORK AND METHOD FOR PRODUCING A SUSPENSION STRUT FORK

(71) Applicant: BENTELER AUTOMOBILTECHNIK GMBH, Paderborn (DE)

(72) Inventors: Frode Paulsen, Gjovik (NO); Stephan Meyer, Bielefeld (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 182 days.

(21) Appl. No.: 17/157,289

(22) Filed: Jan. 25, 2021

(65) Prior Publication Data
US 2021/0229224 A1    Jul. 29, 2021

(30) Foreign Application Priority Data
Jan. 27, 2020    (DE) .................. 10 2020 101 851.7

(51) Int. Cl.
   *B23P 13/04*    (2006.01)
   *B60G 7/00*     (2006.01)
   *B60G 13/00*    (2006.01)

(52) U.S. Cl.
   CPC .............. *B23P 13/04* (2013.01); *B60G 7/001* (2013.01); *B60G 13/005* (2013.01);
   (Continued)

(58) Field of Classification Search
   CPC ............ B60G 7/001; B60G 2206/8102; B60G 2206/81022; B60G 2206/8103;
   (Continued)

(56) References Cited

U.S. PATENT DOCUMENTS

| | | | | |
|---|---|---|---|---|
| 2,780,000 A | * | 2/1957 | Huet ..................... | F28F 9/26 |
| | | | | 72/342.6 |
| 8,474,300 B2 | * | 7/2013 | McKinnon ............ | A61M 5/329 |
| | | | | 72/370.23 |

(Continued)

FOREIGN PATENT DOCUMENTS

| DE | 102016123364 A1 | 6/2018 |
|---|---|---|
| DE | 102017212482 A1 | 1/2019 |

(Continued)

OTHER PUBLICATIONS

Canadian Examination Report of Application No. 3,106,313 dated Oct. 20, 2022; 3pp.
(Continued)

*Primary Examiner* — Moshe Wilensky
(74) *Attorney, Agent, or Firm* — Hauptman Ham, LLP

(57) ABSTRACT

A suspension strut fork that has an upper portion which is constructed in an integral, materially uniform manner in the form of a suspension strut receiving member. Members and fork arms protrude therefrom in an integral, materially uniform manner. A gap is provided between the members. Via this gap, the members can be moved toward each other so that a resilient and/or damper element which is arranged in the suspension strut receiving member is securely clamped.

7 Claims, 5 Drawing Sheets

(52) U.S. Cl.
CPC .... *B23P 2700/14* (2013.01); *B60G 2204/129* (2013.01); *B60G 2206/41* (2013.01); *B60G 2206/7102* (2013.01); *B60G 2206/7103* (2013.01); *B60G 2206/8105* (2013.01); *B60G 2206/84* (2013.01)

(58) Field of Classification Search
CPC ..... B60G 2206/8105; B60G 2206/8111; B23P 13/04; B23P 17/02; B23P 2700/14; F16L 23/08
USPC .............. 72/370.15, 370.23, 370.24, 370.25
See application file for complete search history.

(56) References Cited

U.S. PATENT DOCUMENTS

| | | | |
|---|---|---|---|
| 2007/0204668 A1* | 9/2007 | Shiokawa | B21K 1/767 72/370.15 |
| 2020/0188977 A1* | 6/2020 | Meyer | B21C 23/002 |
| 2021/0229224 A1 | 7/2021 | Paulsen et al. | |

FOREIGN PATENT DOCUMENTS

| | | |
|---|---|---|
| DE | 102017010860 A1 | 5/2019 |
| DE | 102018132315 B3 | 6/2020 |
| DE | 102020101851 A1 | 7/2021 |
| JP | H07246814 A | 9/1995 |

OTHER PUBLICATIONS

Office Action for German Application No. 10 2020101851.7 dated Oct. 27, 2020; 17pp.

Brockhaus Enzyklopaedie, 17th edition, Wiesbaden 1974, vol. 19 (TRIF-WAL), p. 216.

Brockhaus Enzyklopaedie, 17th edition, Wiesbaden 1973, vol. 16 (RIT-SCHO), p. 764.

Lueger Encyclopedia of Technology, Stuttgart 1968, vol. 9 Encyclopedia of Manufacturing Technology and Working Machines; 4pp.

Opposition for German Application No. 10 2020 101 851.7 mailed Mar. 28, 2023; 40pp.

* cited by examiner

SUSPENSION STRUT FORK AND METHOD FOR PRODUCING A SUSPENSION STRUT FORK

RELATED APPLICATIONS

The present application claims priority to German Application Number 10 2020 101 851.7 filed Jan. 27, 2020, the disclosure of which is hereby incorporated by reference herein in its entirety.

FIELD

The present disclosure relates to a suspension strut fork and a method for the production thereof.

BACKGROUND

Suspension strut forks are known from the prior art and are a component of a wheel suspension of a motor vehicle. Suspension strut forks are configured to receive or support a suspension strut or a damper or also combined resilient damper elements. They have two fork arms. At the end of a respective fork arm, connection locations for articulating the suspension strut fork to a corresponding suspension component, for example, a chassis link, are provided.

Generic suspension strut forks are known, for example, from DE 10 2017 010 860 A1 or JP 07246814 A.

However, it is disadvantageous in this instance that the respective suspension strut fork is constructed in a complex manner and where applicable is also cost-intensive to produce.

SUMMARY

An object of the present disclosure is therefore to provide a suspension strut fork in a cost-effective manner at the same time with a high level of precision and a wide area of application with regard to the possible shaping.

The object mentioned above is achieved according to the disclosure with a suspension strut fork.

The suspension strut fork is suitable for a motor vehicle axle. Consequently, it can also be called a motor vehicle suspension strut fork. The suspension strut fork has an upper central suspension strut receiving member or resilient member receiving member and fork arms which extend from the suspension strut receiving member. The fork arms are in this instance connected integrally and in a materially uniform manner to the suspension strut receiving member. This is carried out not as a result of a subsequent coupling but instead already as a result of an integral and materially uniform production.

The suspension strut receiving member is at least on the inner covering face constructed in the form of a cylinder portion or in a cylindrical manner. In a corresponding extension, the fork arms then protrude from the suspension strut receiving member or beyond it. In this instance, there are two fork arms.

The suspension strut receiving member itself has a gap which extends at least partially, or completely, in the longitudinal direction of the suspension strut receiving member.

In the region of the gap or longitudinal slot, two members protrude from the suspension strut receiving member. The members are also formed integrally and in a materially uniform manner on the suspension strut receiving member. Between the two members which form the slot, the gap is constructed in such a manner that a resilient or damper element which is inserted into the suspension strut receiving member is retained therein and is consequently surrounded by the suspension strut receiving member and a securing means is arranged so as to engage through the members and move them toward each other so that the resilient and/or damper element is retained in the suspension strut receiving member in a non-positive-locking manner.

The securing means is at least one screw connection which arranges and screws the members in an engaging manner so that the members are tightened toward each other and consequently tension the resilient and/or damper element in the suspension strut receiving member.

The structural configuration is an integral materially uniform component which is produced according to the method according to the disclosure. Consequently, an optimum tension path is produced as a result of the integral nature and material uniformity within the individual components, which with cost-effective production leads at the same time to an optimized force path and consequently a corresponding robustness and durability of the suspension strut fork.

The gap and the members, which are arranged at the gap, are produced integrally and in a materially uniform manner on the suspension strut receiving member. In this instance, in contrast to the prior art, separate components, such as, for example, clamps, or complex formations of webs, lips or the like, can be dispensed with, but at the same time a simple and effective possibility can be provided for correspondingly clamping the resilient or damper element.

The disclosure makes provision for the suspension strut fork to be produced from an extrusion component. Alternatively or additionally, the suspension strut fork may be produced from an aluminum material. A 6000-series aluminum alloy may be used in this case. The suspension strut fork can be further hardened after the production. As a result of the additional thermal processing operation, the strength may be increased to a tensile strength Rm greater than 300 MPa.

In order to obtain better precision, an inner covering face of the cylindrical portion of the suspension strut receiving member may be mechanically reprocessed. Alternatively or additionally, a gap face or the inner sides of the members which face each other may also be mechanically reprocessed, in a machining manner.

In at least one embodiment, the fork arms are processed using shaping technology. The fork arms may be processed in terms of their cross-section or length portion using shaping technology. However, a respective fork arm may also be processed in the longitudinal direction thereof using shaping technology and may consequently be shaped differently from a linear longitudinal extent. In addition, the fork arms may be stamped. For example, with a longitudinal bead which extends in the longitudinal direction of the fork arms so that the flexural strength of the fork arms is increased by the stamping.

At the ends of the fork arms, receiving members for the coupling to a resilient link or the like are then provided. At least one insert of a metal material, also of a steel material, may be provided. Again, the robustness of the suspension strut fork can also thereby be increased.

The disclosure involves the production method which is characterized by the following method steps:

provide a tubular member produced by means of extrusion, processing the tubular member using cutting technology in such a manner that two semi-finished products are produced, wherein each semi-finished product has a cylindrical upper portion and two arms which protrude therefrom, producing an outer fold on the upper portion by reducing the diameter of the upper portion and constructing two members which protrude from the upper portion, separating the two members, processing the arms using bending technology to form the fork arms, optionally reprocessing individual faces and/or holes of the produced suspension strut fork.

Firstly, a tubular member or blank is consequently produced, from a light metal alloy, in a manner produced by means of extrusion. This tubular member or blank is then cut to length. In this instance, for example, a continuous material may initially be provided, wherein the individual blanks then have a length less than 100 cm, or less than 50 cm. This blank is then processed using cutting technology in such a manner that two preforms are produced from it. The preforms are constructed in a mirror-symmetrical manner. This means that a respective end of the tubular member is processed to form the subsequent suspension strut receiving member. The center portions which face each other are then processed to form individual arms using separation technology, wherein the arms produce the subsequent fork arms. Any waste which may be produced can thereby be minimized.

Two semi-finished products can consequently be produced from the tubular member. Each of these semi-finished products then has an upper portion and two members or fork arms which protrude therefrom. The length of a respective tubular manner is consequently defined by the length of the upper portion, the length of the fork arm and, on the other hand, the length of the upper portion and where applicable the intermediate waste.

Subsequently, a shaping operation is carried out. An outer fold is produced at the end of the pre-form, on which the subsequent suspension strut receiving member is produced. To this end, the covering face of the cylindrical portion is shaped by means of a shaping tool in such a manner that a fold or lip or outer fold is formed and the remaining portion of the suspension strut receiving member is reduced in terms of diameter. The diameter reduction takes place to the benefit of the formation of the outer fold. The outer fold itself is constructed with dual layers. Subsequently, an outer end of the outer fold is processed using separation technology. As a result of the separation of the dual layer, the members which protrude integrally and in a materially uniform manner from the suspension strut receiving member are consequently produced.

Prior to this or also subsequently, a processing of the arms using shaping technology is then carried out so that the arms are shaped or are further processed to form fork arms.

The fork arms can thereby be constructed in terms of their cross-section by the prior production from a tubular member in terms of their cross-section at least in the manner of a semi-circular portion. However, the fork arms are pressed flat at the ends thereof in order in this instance to provide a precise receiving member for a link which is intended to be connected or the like.

In at least one embodiment, the tubular member may have initially a circular cross-section.

Corresponding faces or regions which require a high level of precision with regard to their geometric position may be reprocessed again in a mechanical, machining manner, on the component which has been completely produced using shaping technology.

Optionally or additionally, inserts, such as reinforcement inserts, for example, of steel material, may also be introduced.

BRIEF DESCRIPTION OF THE DRAWINGS

Other features, properties and aspects of the present disclosure are set out in the following description. These Figures serve to provide a simple understanding of the disclosure. In the drawings.

In the figures, the same reference numerals are used for components which are identical or similar, even if the description is not repeated for reasons of simplification.

DETAILED DESCRIPTION

Figure 2:
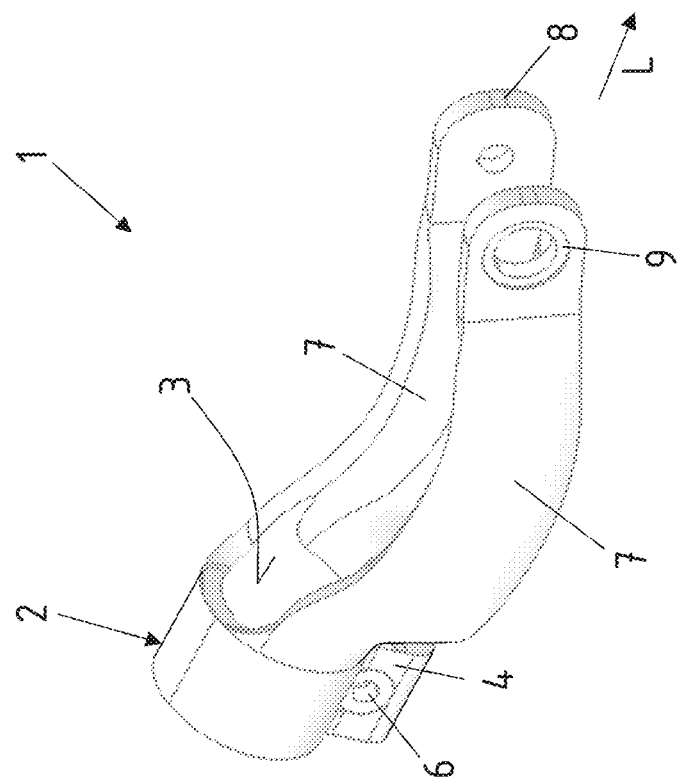
FIG. 1 and FIG. 2 show a suspension strut fork according to at least one embodiment of the disclosure as two different perspective views.
Figure 1:
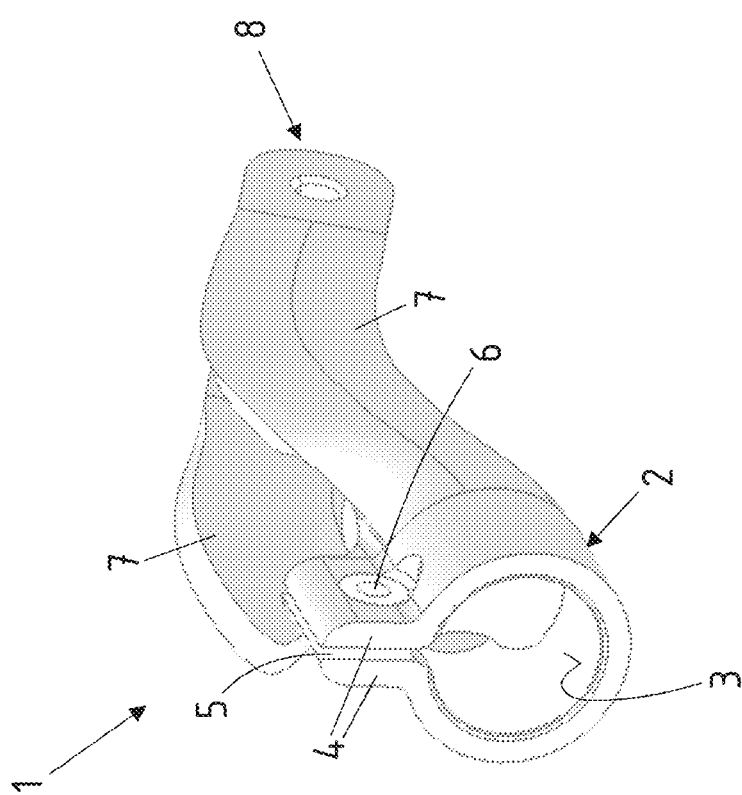

The suspension strut fork 1 has a central suspension strut receiving member 2 which is located at the top with respect to the subsequent installation position. The suspension strut receiving member 2 itself is constructed in a cylindrical manner. This member has an inner covering face 3 in order to receive at that location a resilient and/or damper element which is not illustrated in greater detail. Two webs or members 4 protrude laterally from the cylinder shape. A gap 5 is formed between the members 4. The members 4 have receiving holes 6. A securing means which is not illustrated in greater detail, for example, a screw bolt, may be inserted so as to engage through the receiving holes 6 and consequently the members 4. By tightening the screw bolt, the members 4 are then moved toward each other and a resilient and/or damper element which is arranged in the suspension strut receiving member 2 is/are additionally fixed in a non-positive-locking manner. The inner covering face 3 itself may be reprocessed mechanically so that a higher level of precision is predetermined, for example, reprocessed in a machining manner.

The members 4 are constructed integrally in a materially uniform manner on the suspension strut receiving member 2. The same applies for two fork arms 7. The fork arms 7 extend in the longitudinal direction L from the suspension strut receiving member 2. The fork arms 7 are also constructed integrally in a materially uniform manner on the suspension strut receiving member 2. In an upper portion, consequently in a portion which begins directly on the suspension strut receiving member 2, the fork arms 7 themselves are constructed substantially in the form of a semi-circular portion. At a lower end 8 of the fork arms 7, the fork arms 7 are constructed to be flat in cross-section. The inserts 9 which are illustrated in this instance may be provided, for example, comprising a steel material, so that for receiving or coupling to a suspension strut which is not illustrated in greater detail a higher level of robustness is provided here.

Figure 3:
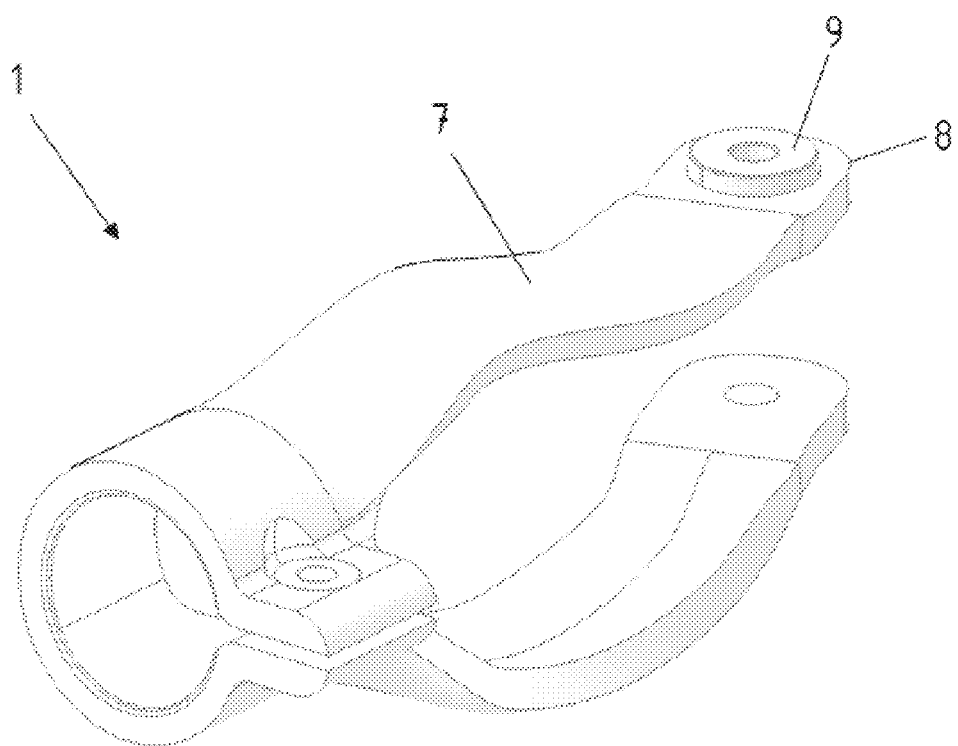
FIG. 3 shows the introduction of an insert according to at least one embodiment of the disclosure.

FIG. 3 shows by way of example the introduction of such an insert 9 in the region of the lower end 8 of a fork arm 7. The insert 9 may, for example, be constructed from a steel material.

The production method is illustrated in FIG. 4A to FIG. 4E. Firstly, a tubular member 10 is provided. The tubular member 10 may itself be constructed as a circular pipe and, for example, be produced, by means of extrusion, from an aluminum alloy. A technical cutting processing operation is then carried out in order to form two semi-finished products 11 illustrated in FIG. 4B. In this instance, a respective upper portion 12 and two arms 13 which extend from the upper portion 12 are cut out. Two semi-finished products 11 are produced in a mirror-symmetrical manner from a tubular member 10.

The length L10 of the tubular member is in this instance defined by twice the length of the upper portion 12 and the length of an arm 13 and where applicable the cutting width of the separation gap produced in order to cut out the arms 13.

Figure 4:
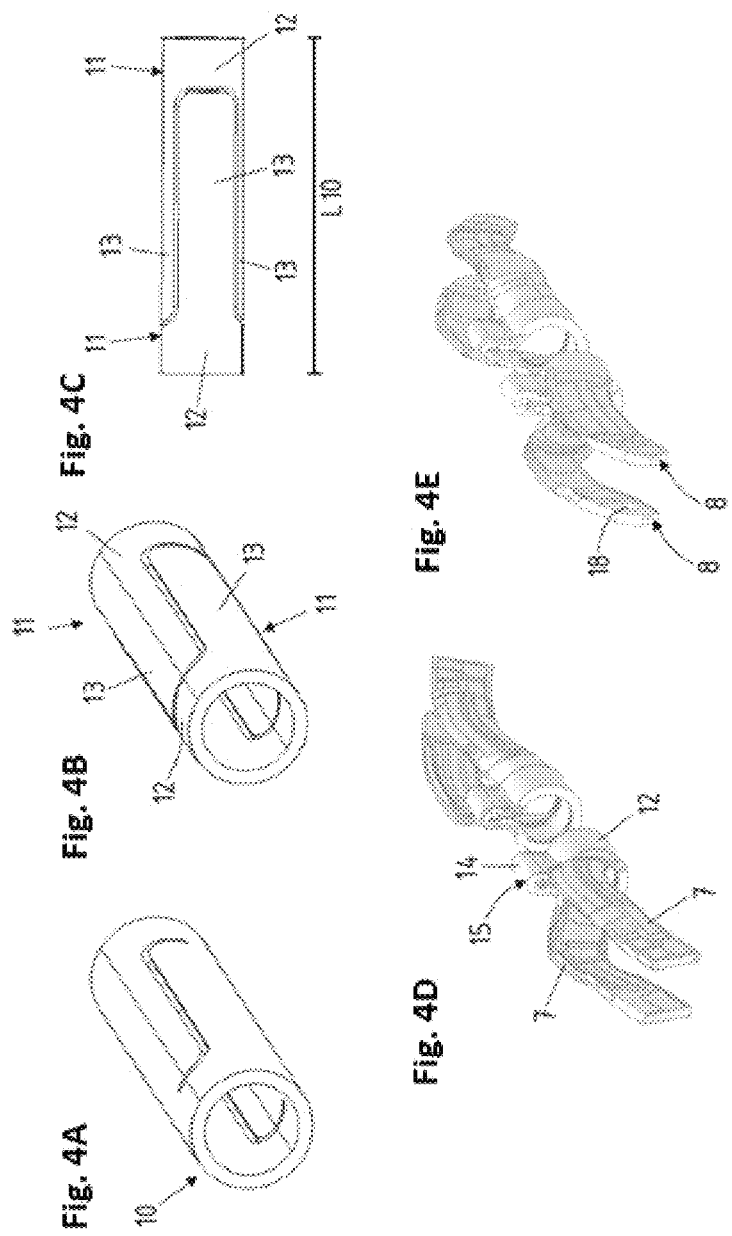
FIG. 4A to FIG. 4E show the sequence of a production method according to at least one embodiment of the disclosure.

The placement in a shaping tool illustrated in FIG. 4D is then carried out. In FIG. 4A to FIG. 4E, the production progress on the component which is intended to be produced is shown. The shaping tools actually used are not illustrated for reasons of simplicity. The component consequently represents a production progress during or after completion of the production step described. In this instance, the upper portion 12 is reduced in terms of its diameter and an outer fold 14 is produced. The diameter of the tubular member 10 is consequently greater than the diameter of the upper portion 12. The diameter reduction consequently forms the possibility for producing the outer fold. The upper portion 12 is consequently bent over to form the suspension strut receiving member 2. The outer fold 14 is subsequently, but as not yet shown in FIG. 4D and FIG. 4E, separated at the outer end 15 thereof so that the two members 4 are constructed. The arms 7 are processed using shaping technology so that the fork arms 7 are produced. According to FIG. 4E, there is then carried out another technical cutting processing operation, for example, of the ends 8 in order to produce connection locations 18.

FIG. 4D and FIG. 4E further illustrate in each case the direct further processing of the two semi-finished products 11 to form two suspension strut forks 1. However, after the production of two semi-finished products 11, only one semi-finished product 11 can also always be further processed. After FIG. 4E, other method steps are carried out but are not illustrated. These are the separation of the outer end 15 of the outer fold 14 so that, as a result of the double layer of the outer fold 14, the two members 4 are constructed. There is also another, for example, machining processing operation and the production of a connection location 18 by the subsequent members, which is, however, not illustrated for reasons of simplicity.

Figure 5:
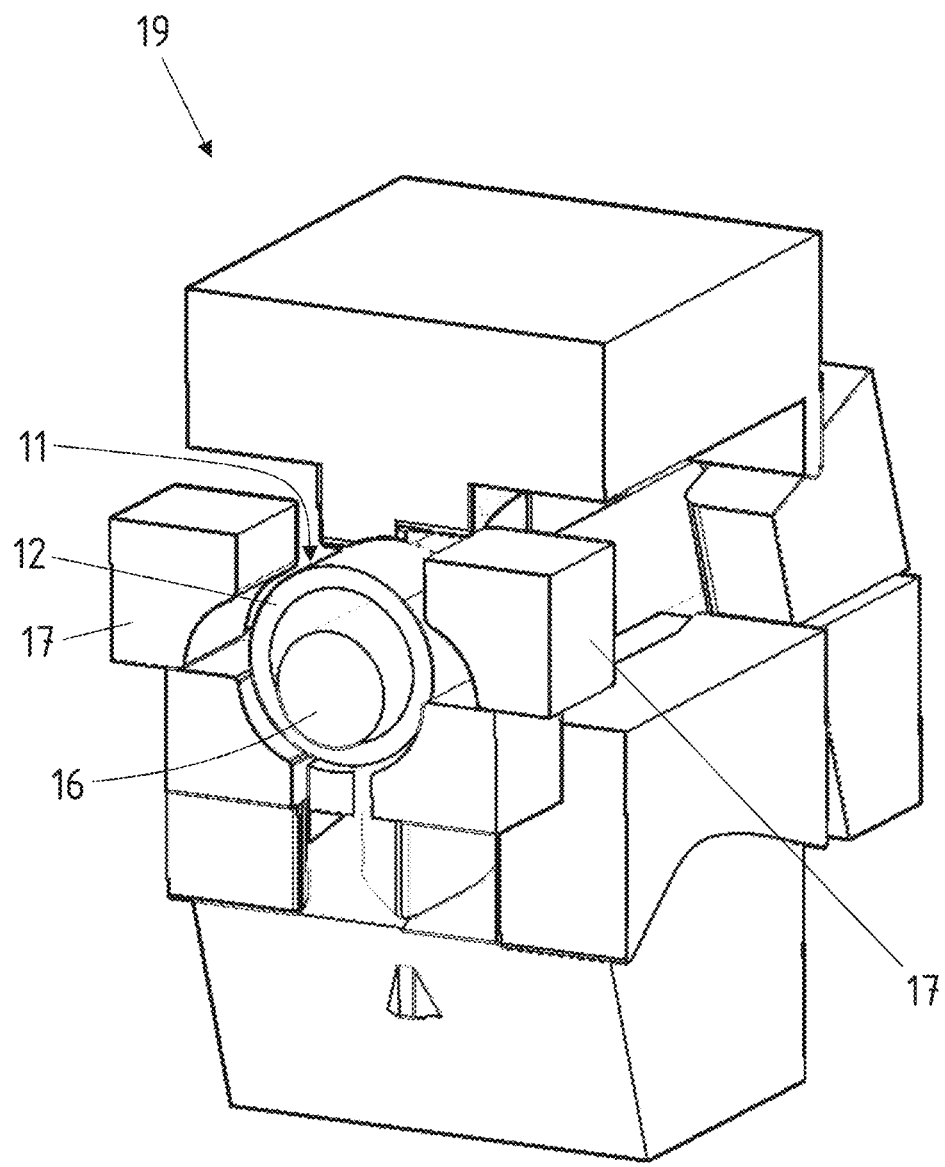
FIG. 5 and FIG. 6 show a shaping tool during the production of an outer fold according to at least one embodiment of the disclosure.
Figure 6:
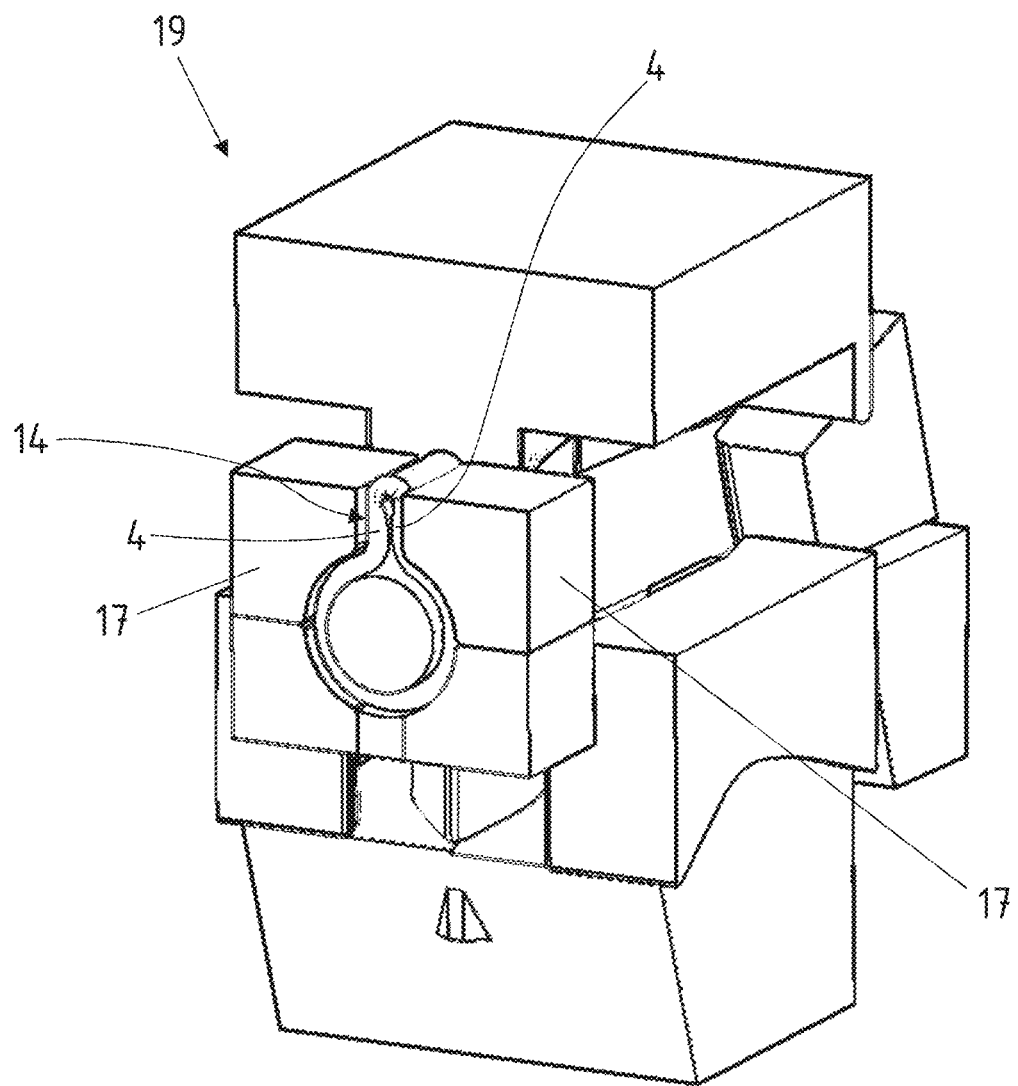

FIG. 5 shows a combined shaping tool for processing the semi-finished product 11 using shaping technology. The front upper portion 12 is in this instance provided with an inner feeder 16 in such a manner that two external jaws 17 are pressed together, which is illustrated in FIG. 6, and consequently the outer fold 14 by reducing the diameter of the upper portion 12 is produced in the form of two outwardly protruding members 4. A visible rear portion of the shaping tool 19 is subsequently moved together again so that the arms are processed using shaping technology to form the fork arms 7.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. A method of producing a suspension strut fork, wherein the method comprises:
   processing a tubular member using cutting technology into two semi-finished products, wherein each of the two semi-finished products has a cylindrical upper portion and two parallel members protruding from the upper portion, and
   for a semi-finished product of the two semi-finished products,
       producing an outer fold on the upper portion by reducing a diameter of the upper portion, to obtain the two parallel members protruding from the upper portion,
       separating the two parallel members, and
       bending the two parallel members.

2. The method according to claim 1, further comprising producing the tubular member by extrusion from a light metal material.

3. The method according to claim 1, wherein the tubular member comprises a circular cross-section.

4. The method according to claim 1, wherein the processing of the two parallel members using the bending comprises at least one of
   shaping the two parallel members over a longitudinal extent thereof, or
   shaping a cross-section of the two parallel members.

5. The method according to claim 1, further comprising reprocessing, in a machining manner, faces of the two parallel members which face each other.

6. The method according to claim 1, further comprising reprocessing individual faces or holes of the suspension strut fork.

7. A method of producing a suspension strut fork, the method comprising:
   cutting a tubular member into two semi-finished products, wherein each of the two semi-finished products has a cylindrical upper portion and two arms protruding from the upper portion, and
   for a semi-finished product of the two semi-finished products,
       producing an outer fold on the upper portion by reducing a diameter of the upper portion, to obtain two parallel members protruding from the upper portion,
       separating the two parallel members, and
       bending the arms into fork arms, to obtain the suspension strut fork.

* * * * *